United States Patent [19]
Gotoda et al.

[11] Patent Number: 5,140,376
[45] Date of Patent: Aug. 18, 1992

[54] TRANSFER AND CONVEYING APPARATUS

[75] Inventors: Katsuhiko Gotoda, Setagaya; Masashi Yasuda, Kobe; Yasunori Mikata, Miki, all of Japan

[73] Assignee: Bando Chemical Industries, Ltd., Hyogo, Japan

[21] Appl. No.: 323,785

[22] Filed: Mar. 15, 1989

[30] Foreign Application Priority Data

| Mar. 15, 1988 | [JP] | Japan | 63-35091[U] |
| Mar. 15, 1988 | [JP] | Japan | 63-62369 |
| Mar. 15, 1988 | [JP] | Japan | 63-62370 |

[51] Int. Cl.⁵ .................................. G03G 15/16
[52] U.S. Cl. ..................... 355/274; 355/271; 355/275; 355/309
[58] Field of Search ............ 355/225, 271, 274, 275, 355/309, 315, 212, 219, 272

[56] References Cited

U.S. PATENT DOCUMENTS

| 2,777,957 | 1/1957 | Walkup | 250/49.5 |
| 3,527,941 | 9/1970 | Culhane et al. | 355/225 X |
| 3,966,199 | 6/1976 | Silverberg | 355/309 X |
| 4,111,157 | 10/1979 | Suzuki | 355/274 X |
| 4,389,112 | 6/1983 | Ogata et al. | 355/274 |
| 4,407,580 | 10/1983 | Hashimoto et al. | 355/275 |
| 4,443,095 | 4/1984 | Tsushima et al. | 357/274 X |
| 4,482,240 | 11/1984 | Kuge et al. | 355/271 X |
| 4,891,334 | 6/1989 | Fukae et al. | 355/271 |

FOREIGN PATENT DOCUMENTS

| 3034089 | 4/1981 | Fed. Rep. of Germany . |
| 3117210 | 2/1982 | Fed. Rep. of Germany . |
| 3217679 | 10/1986 | Fed. Rep. of Germany . |
| 0120282 | 7/1983 | Japan . |
| 0099466 | 6/1984 | Japan | 355/315 |
| 0057355 | 4/1985 | Japan . |
| 0117583 | 6/1986 | Japan | 355/225 |

Primary Examiner—Grimley A. T.
Assistant Examiner—J. E. Barlow, Jr.
Attorney, Agent, or Firm—Wenderoth, Lind & Ponack

[57] ABSTRACT

The transfer and conveying apparatus of the invention transfers a toner image from a photoreceptor onto a recording paper by performing corona discharge at a location opposite to the photoreceptor and adjacent to a portion of a conveying belt which contacts the one of a pair of rollers about which the conveying belt is trained that is closest to the photoreceptor, and conveys the recording paper after transfer of the image by attracting the paper to the belt. This belt is brought into contact with a conductive brush which has AC voltage or DC voltage applied thereto with polarity opposite that applied for transfer of the image to thereby prevent the toner from depositing on the belt. Furthermore, the lower stretched portion of the belt may be wound about the roller through predetermined angular range with the recording paper disposed between the belt and the photoreceptor. The recording paper is thereby resiliently forced against the lower stretched portion of the belt to prevent drooping of the recording paper.

10 Claims, 8 Drawing Sheets

TRANSFER AND CONVEYING APPARATUS

BACKGROUND OF THE INVENTION

1. Field of the Invention

The present invention relates to a transfer and conveying apparatus for use in an image-forming machine for making an electrostatic latent image on a photoreceptor into a sensible image by using toner, and transferring the toner image onto a recording paper, and more particularly to a transfer and conveying apparatus designed to transfer the toner image onto a recording paper which is placed between a conveying belt trained about a pair of conductive rollers and the photoreceptor.

A typical prior art apparatus is shown in FIG. 1. The surface of a photoreceptor 1 is charged by a corona discharger 2, and light 4 is emitted in an exposure region 3, so that an electrostatic latent image corresponding to the information to be recorded is formed. This electrostatic latent image is made into a sensible toner image by a magnetic brush developing device 5. The toner image is then transferred onto a recording paper 9 which is conveyed in a direction indicated by an arrow 8 to a transfer region 7 provided with a corona discharger 6 for transferring the image. After such image transfer has taken place, the recording paper 9 is conveyed in the direction of arrow 11 by a belt conveyor 10 into a fixing apparatus.

In such prior art apparatus, since the toner image is transferred and fixed on the top surface of the recording paper 9, when different pieces of information are recorded on plural recording papers which are to be stacked, the first recording paper is positioned at the bottom of the stack with its recording side up, and the final recording paper is positioned at the top of the stack with its recording side up. In order to attain the papers in their original order, the sequence of the recording papers must be reversed. This procedure is very inconvenient.

Other prior art apparatus have been proposed to solve this problem. For example, one such prior art apparatus operates such that the recording paper is placed between a transfer and conveying belt which is trained about a pair of conductive rollers and a photoreceptor disposed beneath the transfer and conveying belt, and a toner image is transferred from the photoreceptor onto the recording paper and then conveyed away. In such prior art, the recording papers are piled up with the recording side down, such that when the entire pile of the recording papers is turned upside down, the recording papers are sequentially arranged from top to bottom.

In the prior art apparatus using such transfer and conveying belt, it is necessary to apply a high voltage through a brush to a pair of conductive rollers which support the transfer and conveying belt. This causes sparks to form, thereby making it difficult to perform the transfer and conveying operation in a stable manner.

In other prior art transfer and conveying apparatus, meanwhile, the toner is easily deposited on the outer circumference of the belt, such that the surface of the side opposite the recorded side of the recording paper becomes stained.

In still another prior art apparatus, such as that shown in FIG. 2, a right cylindrical photoreceptor 21 is charged by a corona discharger 22 and is exposed in an exposure region 23, and an electrostatis latent image is made into a sensible toner image by a magnetic brush developing device 24. The toner image on the photoreceptor 21 is transferred onto a recording paper 6 and conveyed in the direction of arrow 25 while being held against an endless belt 27. The belt 27 is trained about a pair of conductive rollers 28, 29 and one of the conductive rollers (28) is provided with a voltage from a DC power supply 31 by means of a brush 30. The axis of rotation 33 of the roller 28 is positioned directly above the axis of rotation 32 of the photoreceptor 21. With this arrangement, the recording paper 26 is held between the photoreceptor 21 and belt 27, so as to transfer the image, only in the vicinity of a line 34 which runs between the axis 32 and 33.

In this prior art apparatus, when the recording paper 26 is insufficiently attracted to the belt 27 after transfer of the image, the recording paper 26 sags as indicated by reference number 26a, and cannot be reliably conveyed. This results in jamming of the paper in the apparatus.

SUMMARY OF THE INVENTION

It is hence a primary object of the invention to present a transfer and conveying apparatus capable of transferring and conveying in a stable manner for a long period of time.

To achieve the above object, this invention presents a transfer and conveying apparatus for transferring a toner image from a photoreceptor onto a recording paper placed between a conveying belt trained about a pair of conductive rollers and the photoreceptor, and conveying the recording paper after transfer by attracting it to the conveying belt, which comprises:

a corona discharger for performing corona discharge disposed near the one roller, of a pair of rollers, which is closest to the photoreceptor and is disposed adjacent to the photoreceptor and the part of the belt which contacts this one roller to thereby transfer an image to the paper and the paper by attracting it to the belt.

In a preferred embodiment of the invention, the corona discharger comprises:

a shielded case opening toward the belt and the photoreceptor, a grid disposed between the shielded case and the photoreceptor, a conductor extending through a space formed in the shielded case, and a DC power supply for applying a high voltage between the shielded case and the conductor to perform corona discharge, and applying a voltage to the grid to suppress the surface potential of the recording paper.

According to the invention, since corona discharge is affected by the corona discharger against the photoreceptor and the belt portion which is in contact with one of the rollers at the photoreceptor side of the pair of rollers about which the conveying belt is stretched, the toner image on the photoreceptor can be reliably transferred onto the recording paper, so that after transfer of the image onto the recording paper, the paper can be attracted to and conveyed by the belt.

In particular, in the invention, it is not necessary to hold the paper against the belt by applying a high voltage to the rollers through a brush. This eliminates the possibility of sparks which occur in the prior art apparatus discussed earlier. Therefore, it is possible to transfer and convey in a stable manner for a long period of time.

Thus, according to the invention, it is possible to stack the recording papers sequentially from top to bottom with the recorded side up. It is also possible to transfer images to recording paper in a stable manner for a long period of time, because after transfer of the image, the recording paper can be reliably attracted to and conveyed by the belt.

It is another object of the invention to present a transfer and conveying apparatus which prevents the toner from depositing on the transfer and conveying belt, and which is capable of removing a toner which may be so deposited.

To achieve the above object, the invention presents a transfer and conveying apparatus for transferring a toner image from a photoreceptor onto a recording paper placed between a transfer and conveying belt trained about a pair of conductive rollers and the photoreceptor, and conveying the recording paper after transfer of the image by attracting it to the transfer and conveying belt.

Such transfer and conveying apparatus comprises:

a conductive brush mounted in contact with the belt, and means for applying to the brush an AC voltage or a DC voltage of a polarity opposite to that of the voltage for transferring the image during periods when no toner image to be transferred onto the recording paper exists on the photoreceptor.

In a further preferred embodiment, the voltage applying means comprises:

a changeover switch for selectively switching between connecting the brush to an AC voltage and a DC voltage of opposite polarity relative to the voltage for transfer of the image, a processing circuit for delivering an optical image of the electrostatic latent image to be formed on the photoreceptor, and for outputting an output signal corresponding to the optical image, and a control circuit for receiving the output signal output from the processing circuit, and changing over the switching mode of the changeover switch in response to the signal.

In a different preferred embodiment, the transfer and conveying belt possesses a dielectric layer for contacting the brush, and a conductive layer laminated on the dielectric layer, and the surface potential of the dielectric layer is set to zero during periods when no toner image exists on the photoreceptor.

According to the invention, the conductive brush contacts the outer circumference of the transfer and conveying belt, and (a) an AC voltage, or (b) a DC voltage of the reverse polarity of the voltage for transfer is applied to the brush. Hence, the surface potential of the outer circumference of the belt becomes (a) a zero potential, or (b) a potential of a polarity opposite to that of the potential for depositing the toner. Therefore, deposit of the toner on the belt is prevented, and if the toner should deposit on the belt, it can be easily removed by a wiping off means.

The belt is in contact with the brush, and the brush bristles are fine, so that the belt may be charged easily without the need for a particularly high voltage.

Thus, the invention is designed to supply the belt with an AC voltage or a DC voltage during periods when no toner image present on the photoreceptor, so that the surface potential of the transfer and conveying belt in the transfer region may be zero or of a polarity opposite to that of the electric charge of the toner. This makes it possible to prevent the toner from depositing on the belt, or, if some toner is deposited, to wipe it off easily.

It is a further object of the invention to present a transfer and conveying apparatus capable of conveying the recording paper reliably by attracting it to the belt, after transferring the toner image onto the recording paper as it moves between the photoreceptor and the belt.

To achieve this object, the invention presents a transfer and conveying apparatus for transferring an image onto a recording paper by moving the recording paper between an endless belt trained about a pair of rollers and a photoreceptor on which a toner image is formed, and for conveying the recording paper after transfer of the image by attracting the recording paper to the lower stretched portion of the belt, in which the lower stretched portion of the belt contacts the photoreceptor over a predetermined angular range of the photoreceptor through the recording paper, so that the recording paper is thrust toward the lower stretched portion of the belt as it is separated from the photoreceptor.

Thus in the invention, the lower stretched portion of the belt contacts the photoreceptor over a predetermined angular range of the photoreceptor through the recording paper. Therefore, at the position where the recording paper is held between the photoreceptor and the belt is separated from the photoreceptor, the paper is elastically forced against the lower stretched portion of the belt by its own resiliency. As a result, the recording paper is tightly attracted to the lower stretched portion of the belt. It is hence possible to prevent the recording paper from being separated and drooping down from the belt unexpectedly.

Thus, according to the invention, since the lower stretched portion of the belt contacts the roller over a predetermined angular range, the recording paper separated from the photoreceptor is thrust toward the lower stretched portion of the belt by its own resiliency, so that drooping-down of the belt from the lower stretched portion is prevented. Therefore, it is possible to convey the recording paper by securely attracting it to the lower stretched portion of the belt, so that paper jamming and other trouble is prevented.

BRIEF DESCRIPTION OF THE DRAWINGS

These and other objects of the invention, along with the features and advantages thereof, will be better understood and appreciated from the detailed description taken in conjunction with the drawings, in which.

DETAILED DESCRIPTION OF THE PREFERRED EMBODIMENTS

Figure 1:
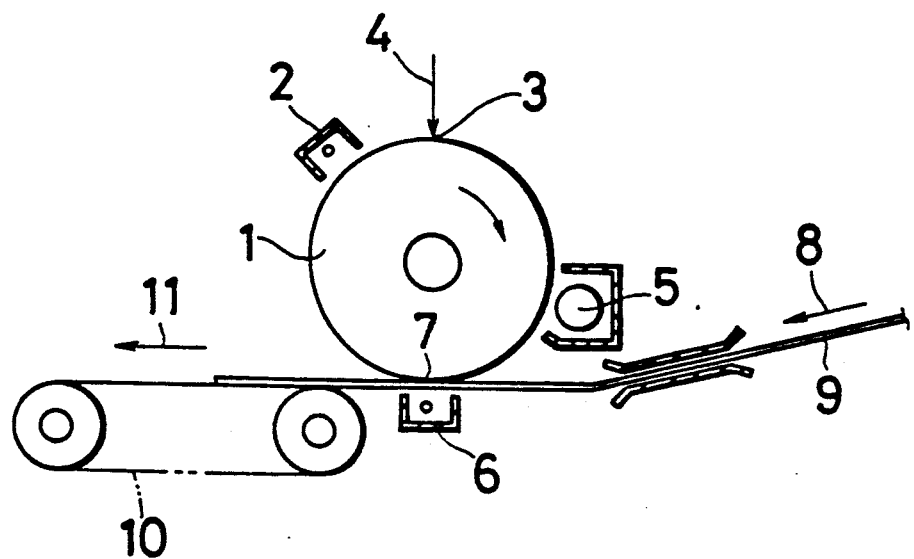
FIG. 1 is a simplified sectional view of a prior art apparatus.
Figure 2:
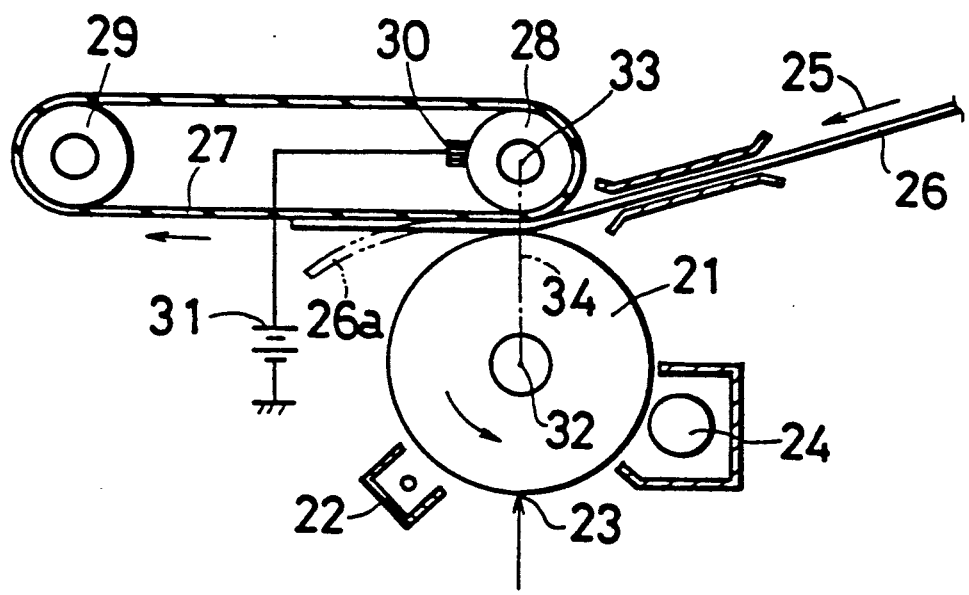
FIG. 2 is a simplified sectional view of another prior art apparatus.

Referring now to the drawings, some of the preferred embodiments of the invention are described in detail below.

Figure 3:
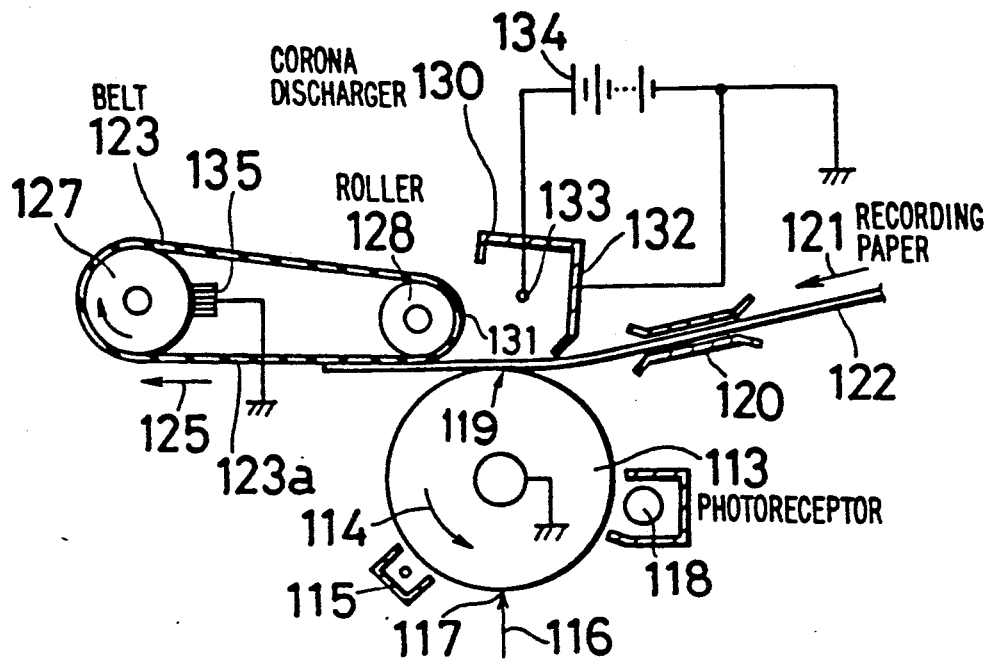
FIG. 3 is a sectional view of a first embodiment of the invention.

FIG. 3 is a simplified sectional view of a first embodiment of the invention. In this embodiment, in a printer or similar machine, a right cylindrical grounded photoreceptor 113 is driven in the rotational direction indicated by arrow 114. This photoreceptor 113 is charged by a corona discharger 115, and is exposed in an exposure region 117 by a light 116 corresponding to the original image, so that an electrostatic latent image is formed on the surface of the photoreceptor 113. This electrostatic latent image is made into a sensible toner image by a magnetic brush development apparatus 118. The toner image on the photoreceptor 113 is transferred onto a recording paper 122 which is guided in the direction indicated by arrow 121 by a guide member 120 to a transfer region 119. After transfer of the image onto the recording paper, the recording paper 122 is conveyed in the direction indicated by arrow 125 by a lower stretched portion 123a of a belt 123 to a fixing apparatus.

The conveying belt 123 is endless, and is driven about a pair of conductive rollers 127, 128. The inner surface of the conveying belt 123 includes a conductive layer thereon in contact with the rollers 127, 128, and the belt also includes a dielectric layer. The conductive layer is composed of metal, conductive rubber or similar material. The dielectric layer is composed of an electrically insulating material.

A corona discharger 130 is mounted adjacent the roller 128 nearest to the photoreceptor 113. This corona discharger 130 is disposed on the side of the belt 123 opposite the roller 128, and on the side of the recording paper 122 opposite the upper part of the outer circumference of the photoreceptor 113. The corona discharger 130 comprises a metallic shielded case 132, and a conductor 133 which is disposed in a stretched condition in a space formed within the shielded case 132. The shielded case 132 and the conductor 133 extend parallel to the rotational axis of the photoreceptor 113 and perpendicular to the direction indicated by arrows 122 and 125. The shielded case 132 is grounded and the conductor 133 is connected to the positive electrode of a DC power supply 134. The negative electrode of this DC power supply is grounded to the machine body.

When a corona discharge is effected by the corona discharger 130, the toner image on the photoreceptor 113 is transferred onto the lower surface of the recording paper 122 being conveyed in the conveying direction 121. The portion 131 of the belt 123 wound on the roller 128 is electrified by the corona discharge mentioned above. This causes the recording paper 122 after the image has been transferred thereto to be attracted to the lower stretched portion 123a of the belt 123 such that the paper 122 can be conveyed thereby in the direction indicated by arrow 125. A brush 135 contacts the roller 127 and is grounded to the machine body. Therefore, it is not necessary to connect a high voltage power supply to the rollers 127, 128 through the brush as was necessary in a previously discussed prior art apparatus. Thus, no spark is generated so that transfer and conveying by attraction can be carried out in a stable manner for a long period of time.

Figure 4:
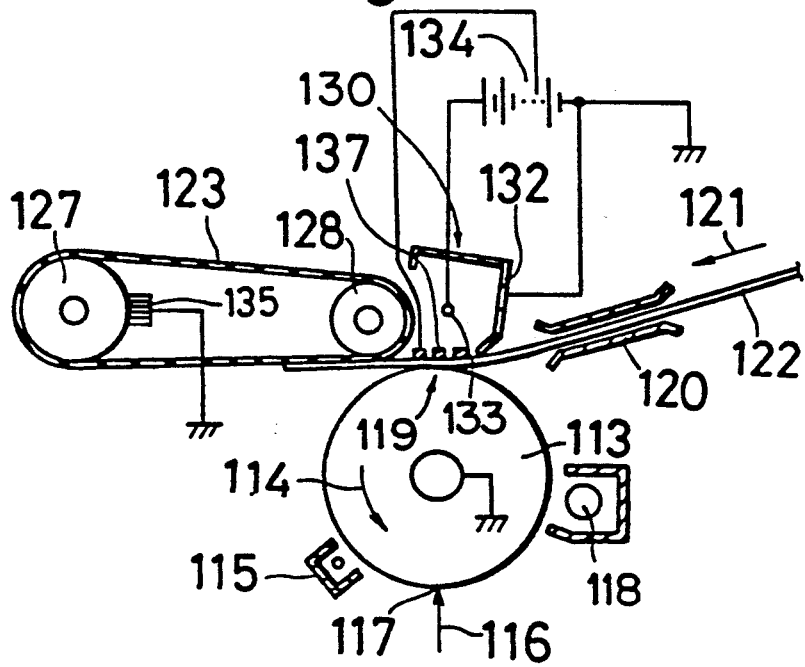
FIG. 4 is a sectional view of a second embodiment of the invention.

FIG. 4 is a simplified sectional view of a second embodiment of the invention. This embodiment is similar to the foregoing embodiment shown in FIG. 3, and the corresponding parts are identified with the same reference numbers. Here, in the corona discharger 130, a mesh grid 137 is placed between the shielded case 132 and the photoreceptor 113 and is connected to the positive electrode of the DC power supply 134. As a result, increase of the surface potential of the recording paper 122 by corona discharge is suppressed, and the surface potential of the recording paper 122 can be set to a suitable value to provide attraction and conveying of the recording paper 122 by the conveying belt after transfer of the image onto the paper 122.

Figure 5:
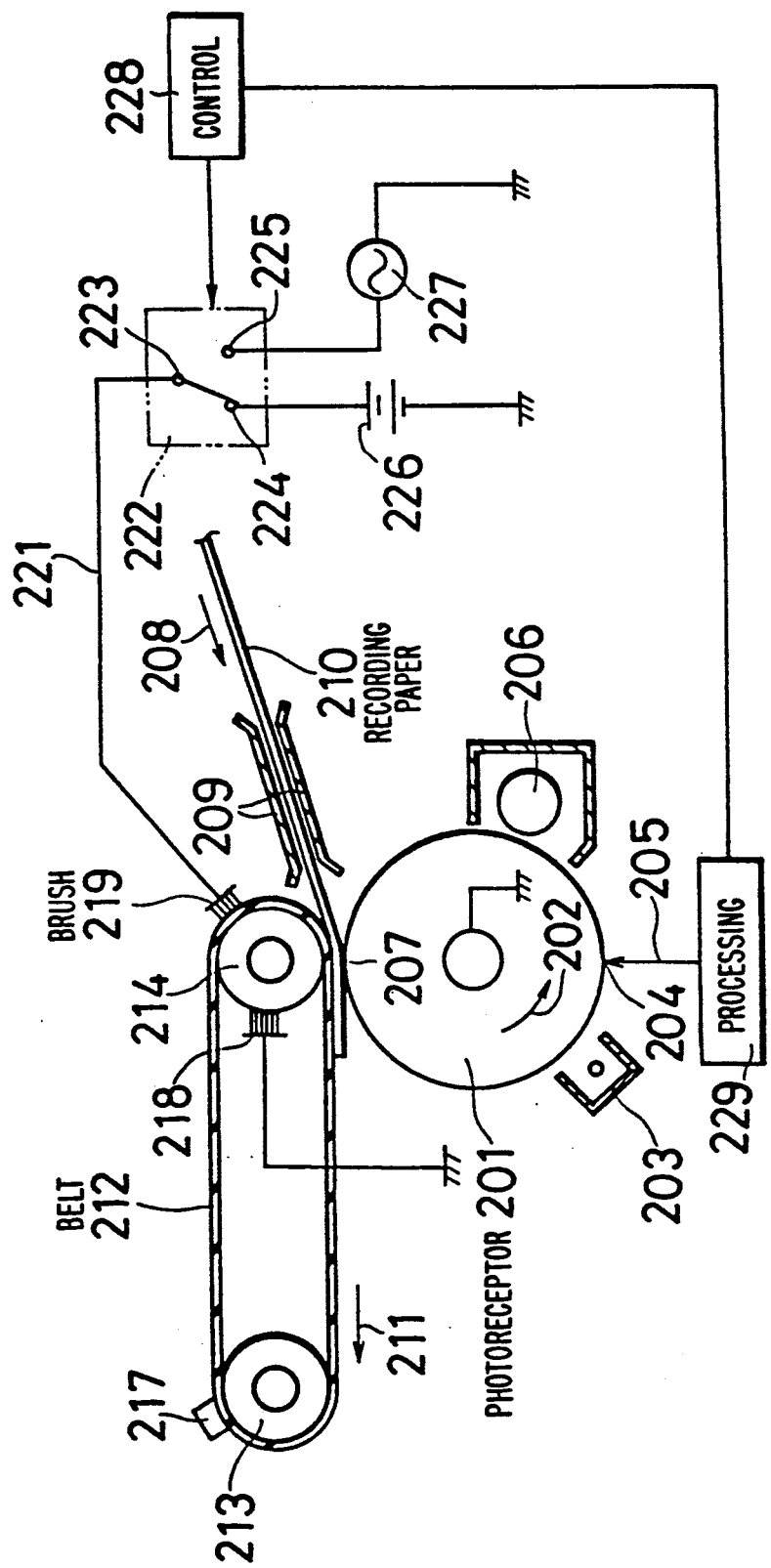
FIG. 5 is a sectional view of a third embodiment of the invention.

FIG. 5 is a simplified sectional view of a third embodiment of the invention. A grounded right cylindrical photoreceptor 201 is rotated and driven in the direction indicated by arrow 202. This photoreceptor 201 is charged by a corona discharger 203, and is irradiated with a light 205 in an exposure region 204 to form an electrostatic latent image. The electrostatic latent image on the photoreceptor 201 is made into a sensible toner image by a magnetic brush developing apparatus 206, and the toner image is transferred onto the recording paper 210 after the recording paper 210 is guided by a guide member 209 in the direction indicated by arrow 208 to a transfer region 207. After transfer of the image onto the paper 210, the recording paper 210 is conveyed in the direction indicated by arrow 211 to the fixing apparatus. This conveyance is carried out by an endless transfer and conveying belt 212 to which the conveying paper 210 is attracted. The belt 212 is trained about a pair of conductive rollers 213, 214, and the recording paper 210 is held between the belt 212 and the photoreceptor 201 when the image is being transferred.

Figure 6:
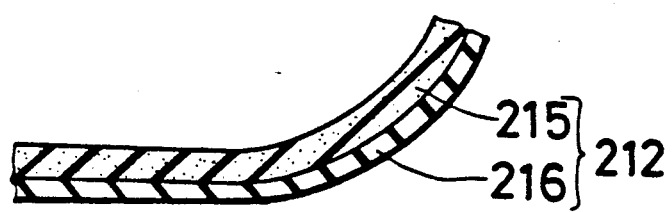
FIG. 6 is a sectional view of a transfer and conveying belt.

The belt 212 is composed of, as shown in FIG. 6, a conductive layer 215 and a dielectric layer 216, and the conductive layer 215 contacts the rollers 213, 214. The outer circumference of the belt 212 is contacted by a wipe-off member 217 so that the undesired deposit of toner on the surface of the dielectric layer 216 of the belt 212 is wiped off and removed. The roller 214 contacts a brush 218, and the dielectric layer 216 of the belt 212 which is grounded to the machine body contacts a brush 219. This brush 219 extends in the widthwise direction (the direction perpendicular to the sheet of paper of FIG. 5) of the belt 212.

Figure 7:
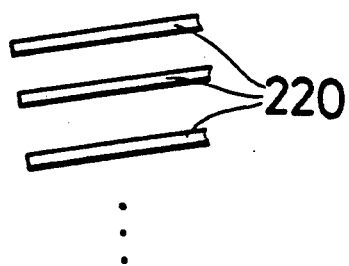
FIG. 7 is a partial perspective view of a brush.

The brush 219 is composed, as shown in FIG. 7, so that the free ends of multiple metal bristles 220 may elastically contact the surface of the dielectric layer 216 of the belt 212. Such bristles 220 are fine and long like needles. Aside from such metallic bristles 220, other materials may be used, such as compositions of metal power, carbon or other conductive powder with synthetic resin.

The brush 219 is connected to a common contact 223 of a changeover switch 222 through a line 221. This changeover switch 222 includes two individual contacts 224, 225, one 224 of which is connected to a negative electrode of the DC power supply 226. The other individual contact 225 is connected to an AC power supply 227. The control circuit 228 controls the switching mode of the changeover switch 222. An optical image of the electrostatic latent image to be formed on the photoreceptor 201 is delivered by light 205 from a processing circuit 229 which also sends an output signal corresponding to the optical image to the control circuit 228.

During operation, the portion of the photoreceptor 201 which is to be exposed is continuously irradiated with the light 205. During formation of an electrostatic latent image, the common contact 223 of the changeover switch 222 is connected with the individual contact 224, and the dielectric layer 216 of the belt 212 is charged to a positive high potential. Therefore, the toner image on the photoreceptor 201 is transferred onto the recording paper 210 held between the belt 212 and photoreceptor 201, and the recording paper 210 is attracted to the belt 212 and is conveyed in the direction indicated by arrow 211.

During periods when an image is not being transferred, the common contact 223 of the changeover switch 222 is connected with the individual contact 225. Accordingly, the voltage of the AC power supply 227 is applied to the dielectric layer 216 of the belt 212. Therefore, the surface potential of the dielectric layer 216 becomes zero. Hence, the toner which possesses a negative electric charge is not deposited on the surface of the dielectric layer 216, and if some of the toner is deposited, it can be easily wiped off by the wipe-off member 217. Additionally, the light 205 is not emitted from the processing circuit 229 to the exposure region 204 of the photoreceptor 201 and no electrostatic latent image is formed on the photoreceptor 201. When the toner image to be transferred is not present in the transfer region 207, the timing of the change of the switching mode of the common contact 223 of the changeover switch 222 is adjusted so that the region of the belt 212 present in the transfer region 207 is uncharged.

Figure 8:
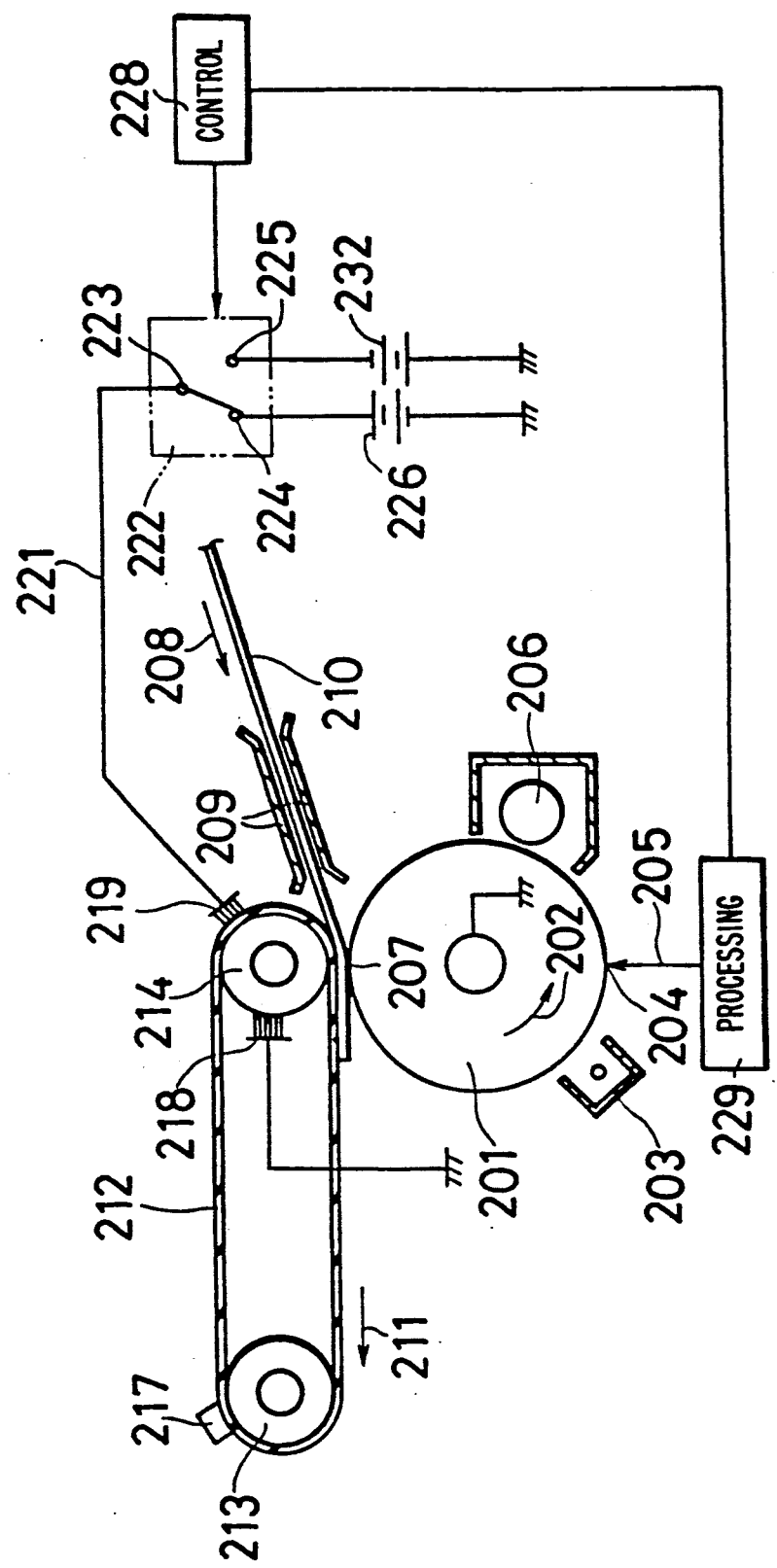
FIG. 8 is a sectional view of a fourth embodiment of the invention.

FIG. 8 is a simplified sectional view of a fourth embodiment of the invention. This embodiment is similar to the one shown in FIG. 5, but rather than using one DC power supply 226 and one AC power supply 227, two DC power supplies 226 and 232 are used. The DC power supply 232 applies a DC voltage to individual contact 225 which has a polarity which is opposite that applied by the DC power supply 226 to the individual contact 225 of the changeover switch 222. The remaining structure and operation of this fourth embodiment are same as those in the foregoing embodiments.

Figure 9:
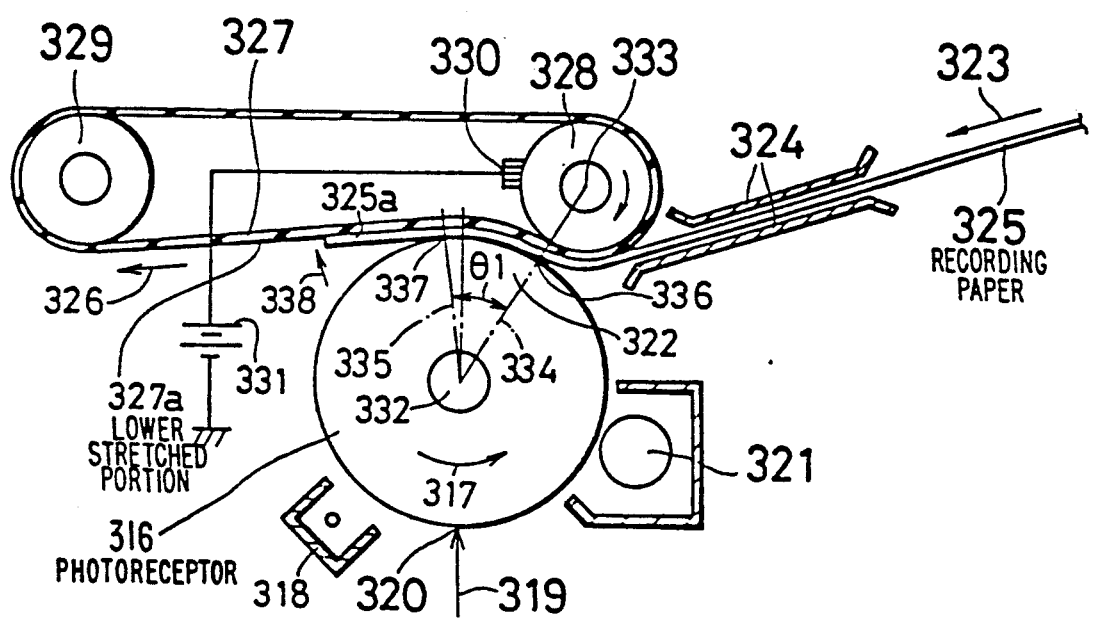
FIG. 9 is a simplified sectional view of a fifth embodiment of the invention.

FIG. 9 is a simplified sectional view of a fifth embodiment of the invention. A right cylindrical photoreceptor 316 is driven in a rotational direction indicated by arrow 317, charged by a corona discharger 318, and irradiated and exposed in an exposure region 320 with a light 319 corresponding to an original image to thereby form an electrostatic latent image. The toner image on the photoreceptor 316 is transferred onto a recording paper 325 which has been guided by a guiding member 324 in the direction indicated by arrow 323 to a transfer region 322. The recording paper is then led into a fixing apparatus in the direction indicated by arrow 326.

An endless belt 327 is trained and stretched about a pair of conductive rollers 328, 329. This belt 327 is formed with a dielectric layer on the outer circumference of a dielectric layer which contacts the rollers 328, 329. One roller 328 contacts a brush 330 which has a voltage applied thereto by a DC power supply 331.

A center line 334 linking a horizontal rotational axis 332 of the photoreceptor 316 and a horizontal rotational axis 333 of the roller 328 is located upstream in the conveying direction 323 (to the right in FIG. 9) from a line 335 which run through the rotational axis 332 of the photoreceptor 316 and a position 337 at which paper will separate from the photoreceptor 316. The recording paper 325 is held between the photoreceptor 316 and a lower stretched portion 327a of the belt 327, moves from the position indicated by reference number 336 on the center line 334, and contacts the outer circumference of the photoreceptor 316 over a range $\theta 1$ until it reaches the position 337 where the recording paper 325 is separated from the outer circumference of the photoreceptor 316, so that the toner image can be transferred onto the recording paper 325. The peripheral speed of the photoreceptor 316 and the peripheral speed of the belt 327 are identical.

Since the recording paper 325 is moved in a curved manner in tight contact with the outer circumference of the photoreceptor 316 through the range of the angle $\theta 1$ between positions 336 and 337 where the recording paper 325 is separated from the outer circumference of the photoreceptor 316, an elastic force is created in the direction indicated by arrow 338 and acts against the tip 325a of the recording paper 325. Do to this elastic force, the tip 325a is thrust upward, as shown in FIG. 9. Therefore, after separation from the outer circumference of the photoreceptor 316 at the position 337, the recording paper 325 is thrust toward the side of the lower stretched portion 327a of the belt 327. The paper is maintained tightly against the belt 327 by the electrostatic force of the belt 327. Thus, the recording paper 325 is maintained in contact with the lower stretched portion 327a of the belt 327 as it is conveyed in the direction indicated by the arrow 326, such that the recording paper 325 does not separate from the lower stretched portion 327a and droop down during conveyance.

Figure 10:
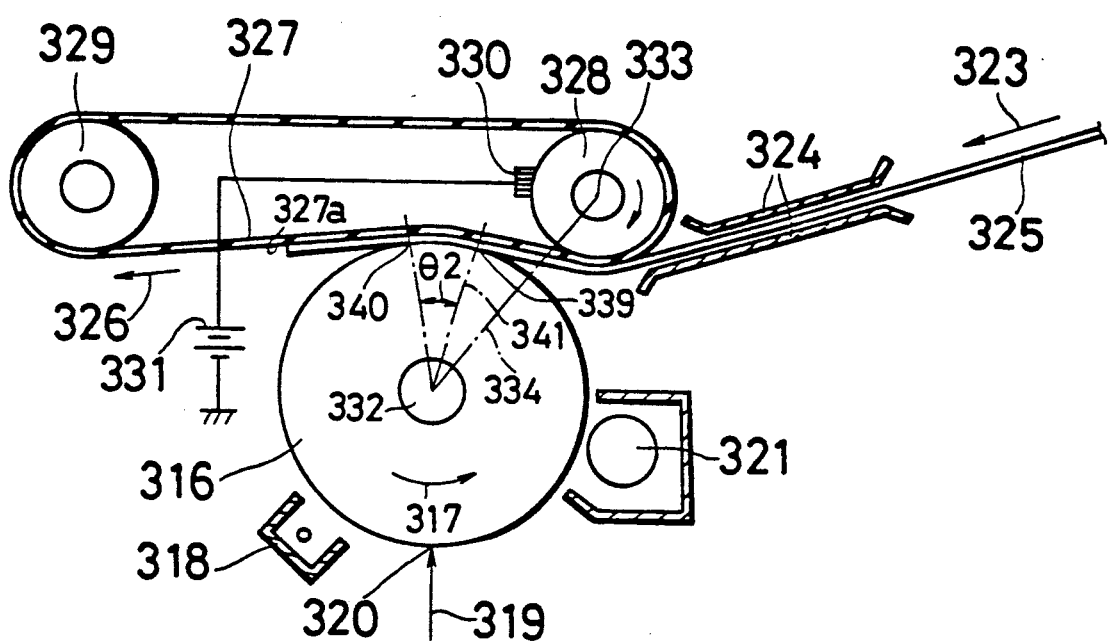
FIG. 10 is a simplified sectional view of a sixth embodiment of the invention.

FIG. 10 is a simplified sectional view of a sixth embodiment of the invention. This embodiment is similar to the one shown in FIG. 9, and the corresponding parts are identified with the same reference numbers. In this embodiment, however, the lower stretched portion 327a of the paper 325 (or the belt 327 if no paper is present) contacts the photoreceptor 316 through an angle $\theta 2$ between positions 339 and 340 of the photoreceptor 316. The line 341 linking the rotational axis 332 of the photoreceptor 316 and the position 339 is upstream in the conveying direction 323 of the center line 332 linking the rotational axis 332 of the photoreceptor 316 and the rotational axis 333 of the roller 328. Also in this embodiment, the recording paper 325 after being separated from the outer circumference of the photoreceptor 316 at the position 340 is thrust against the underside of the lower stretched portion 327a of the belt 327 by the resiliency of the recording paper 325 itself. As a result, after transfer of an image onto the recording paper 325, the paper 325 tightly contacts the lower stretched portion 327a of the belt 327.

The invention may be embodied in other specific forms without departing from the spirit or essential characteristics thereof. The present embodiments are therefore to be considered in all respects as illustrative and not restrictive, and the scope of the invention is indicated by the appended claims rather than by the foregoing description.

Furthermore, all changes and modifications which come within the meaning and range of equivalency of the claims are therefore intended to be embraced therein.

What is claimed is:

1. A transfer and conveying apparatus for transferring a toner image to a recording paper and for conveying the recording paper in a downstream direction, comprising:
- a grounded rotatable photoreceptor for receiving the toner image thereon and for transferring the toner image therefrom to the recording paper in a transfer region;
- a pair of rollers mounted relative to said photoreceptor, one of said pair of rollers being mounted closer to said photoreceptor than the other of said pair of rollers and being spaced a predetermined distance above said photoreceptor, at least one of said pair of rollers being conductive and grounded;
- a conveying belt trained about said pair of rollers, disposed downstream from said photoreceptor, and adapted to attract the recording paper thereto;
- a single corona discharger comprising means for effecting a corona discharge to the recording paper in said transfer region to transfer the toner image and to the conveying belt at a location where said belt contacts said one of said pair of rollers which is mounted closest to said photoreceptor; and
- at least one power supply means for supplying power to said corona discharge means.

2. A transfer and conveying apparatus as recited in claim 1, wherein
said corona discharge means comprises:
- a grounded shielded case opening toward both said conveying belt and said photoreceptor;
- a grid mounted between said shielded case and said photoreceptor and connected to said at least one power supply means; and
- a conductive wire extending through a space formed within said shielded case and connected to said at least one power supply means.

3. A transfer and conveying apparatus as recited in claim 2, wherein
said conveying belt includes a dielectric outer surface and a conductive inner surface.

4. A transfer and conveying apparatus as recited in claim 3, wherein
said corona discharge means is mounted directly above said photoreceptor.

5. A transfer and conveying apparatus as recited in claim 1, wherein
said corona discharge means is mounted directly above said photoreceptor.

6. A transfer and conveying apparatus for transferring a toner image to a recording paper and for conveying the recording paper in a downstream direction, comprising:
- a grounded rotatable photoreceptor for receiving the toner image thereon and for transferring the toner image therefrom to the recording paper in a transfer region during passage of the recording paper above said photoreceptor;
- a single corona discharger disposed at a predetermined distance above said photoreceptor and comprising means for effecting a corona discharge to said photoreceptor in said transfer region to transfer the toner image and to a predetermined location spaced above and downstream of said transfer region;
- a pair of rollers mounted relative to both said photoreceptor and said corona discharge means, one of said pair of rollers being mounted closer to said photoreceptor than the other of said pair of rollers and being spaced a predetermined distance above said photoreceptor, a predetermined distance downstream of said photoreceptor, and a predetermined distance downstream from said corona discharge means within an effective range of the corona discharge from said corona discharge means, at least one of said pair of rollers being conductive and grounded;
- a conveying belt trained about said pair of rollers and disposed downstream from said photoreceptor, said conveying belt being adapted to receive an electric potential at a portion thereof contacting said one of said pair of rollers due to the corona discharge from said corona discharge means, so as to cause the recording paper to be attracted to a lower portion of said conveying belt; and
- at least one power supply means for supplying power to said corona discharge means.

7. A transfer and conveying apparatus as recited in claim 6, wherein
said corona discharge means comprises:
- a grounded shielded case opening toward both said conveying belt and said photoreceptor;
- a grid mounted between said shielded case and said photoreceptor and connected to said at least one power supply means; and
- a conductive wire extending through a space formed within said shielded case and connected to said at least one power supply means.

8. A transfer and conveying apparatus as recited in claim 7, wherein
said power supply means is operable for supplying power to both said conductive wire and said grid of said corona discharge means.

9. A transfer and conveying apparatus as recited in claim 8, wherein
said conveying belt includes a dielectric outer surface.

10. A transfer and conveying apparatus as recited in claim 6, wherein
said conveying belt includes a dielectric outer surface.

* * * * *